(12) United States Patent
Moriyama et al.

(10) Patent No.: US 8,331,015 B2
(45) Date of Patent: Dec. 11, 2012

(54) DISPLAY MEDIUM AND DISPLAY DEVICE

(75) Inventors: Hiroaki Moriyama, Kanagawa (JP);
Yasuo Yamamoto, Kanagawa (JP);
Yoshinori Machida, Kanagawa (JP);
Ryota Mizutani, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 19 days.

(21) Appl. No.: 13/015,129

(22) Filed: Jan. 27, 2011

(65) Prior Publication Data

US 2012/0069423 A1   Mar. 22, 2012

(30) Foreign Application Priority Data

Sep. 22, 2010   (JP) .................................. 2010-212752

(51) Int. Cl.
*G02B 26/00* (2006.01)
*G09G 3/34* (2006.01)
(52) U.S. Cl. ........................................ 359/296; 345/107
(58) Field of Classification Search .................. 359/296; 345/107
See application file for complete search history.

(56) References Cited

U.S. PATENT DOCUMENTS

| | | | |
|---|---|---|---|
| 5,863,684 A | 1/1999 | Suzuki et al. | |
| 6,844,958 B2 | 1/2005 | Kawai | |
| 7,692,846 B2 | 4/2010 | Okuyama et al. | |
| 2012/0068990 A1* | 3/2012 | Moriyama et al. ............ | 345/212 |

FOREIGN PATENT DOCUMENTS

| | | |
|---|---|---|
| JP | A-01-248182 | 10/1989 |
| JP | A-07-325434 | 12/1995 |

(Continued)

*Primary Examiner* — Jack Dinh
(74) *Attorney, Agent, or Firm* — Oliff & Berridge, PLC

(57) ABSTRACT

A display medium including a pair of substrates, a dispersion medium sealed between the pair of substrates, a migrating particle group dispersed in the dispersion medium, and a surface layer provided on at least one of the facing surfaces of the pair of substrates and including a copolymer containing the following constitutional unit (A) and constitutional unit (B), wherein X represents a group containing a silicone chain, $Ra_1$ and $Ra_2$ each independently represent a hydrogen atom or a methyl group, $Rb_2$ represents an organic group containing a fluorine atom, n1 and n2 each represent mol% of the constitutional unit relative to the whole copolymer and satisfy 0<n1<50 and 0<n2<50, respectively, and n represents a natural number of 1 or more and 3 or less.

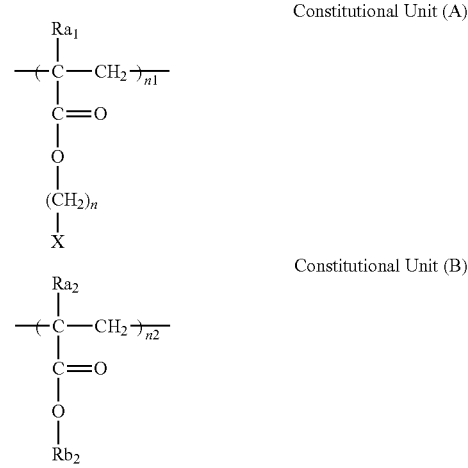

11 Claims, 2 Drawing Sheets

FOREIGN PATENT DOCUMENTS

| | | |
|---|---|---|
| JP | A-10-003177 | 1/1998 |
| JP | A-2003-131420 | 5/2003 |
| JP | A-2004-279647 | 10/2004 |
| JP | A-2005-275215 | 10/2005 |
| JP | A-2008-310003 | 12/2008 |
| WO | WO 2004/077140 A1 | 9/2004 |
| WO | WO 2004/079441 A1 | 9/2004 |

* cited by examiner

DISPLAY MEDIUM AND DISPLAY DEVICE

CROSS-REFERENCE TO RELATED APPLICATIONS

This application is based on and claims priority under 35 USC 119 from Japanese Patent Application No 2010-212752 filed Sep. 22, 2010.

BACKGROUND

Technical Field

The present invention relates to a display medium and a display device.

SUMMARY

According to an aspect of the invention, there is provided a display medium including a pair of substrates at least one of which has translucency and which are disposed with a space therebetween, a dispersion medium sealed between the pair of substrates, a migrating particle group dispersed in the dispersion medium so as to migrate in the dispersion medium according to an electric field formed between the pair of substrates, and a surface layer provided on at least one of the facing surfaces of the pair of substrates and including a polymer compound that is a copolymer containing the following constitutional unit (A) and constitutional unit (B):

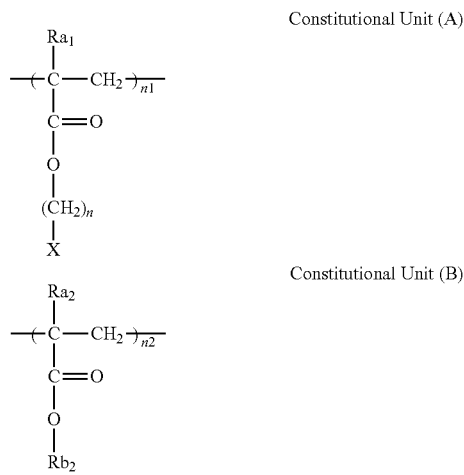

In the constitutional units (A) and (B), X represents a group containing a silicone chain, $Ra_1$ and $Ra_2$ each independently represent a hydrogen atom or a methyl group, $Rb_2$ represents an organic group containing a fluorine atom, n1 and n2 each represent mol % of the constitutional unit relative to the whole copolymer and satisfy $0<n1<50$ and $0<n2<50$, respectively, and n represents a natural number of 1 or more and 3 or less.

BRIEF DESCRIPTION OF THE DRAWINGS

Exemplary embodiments of the present invention will be described in detail based on the following figures, wherein.

DETAILED DESCRIPTION

Figure 1:
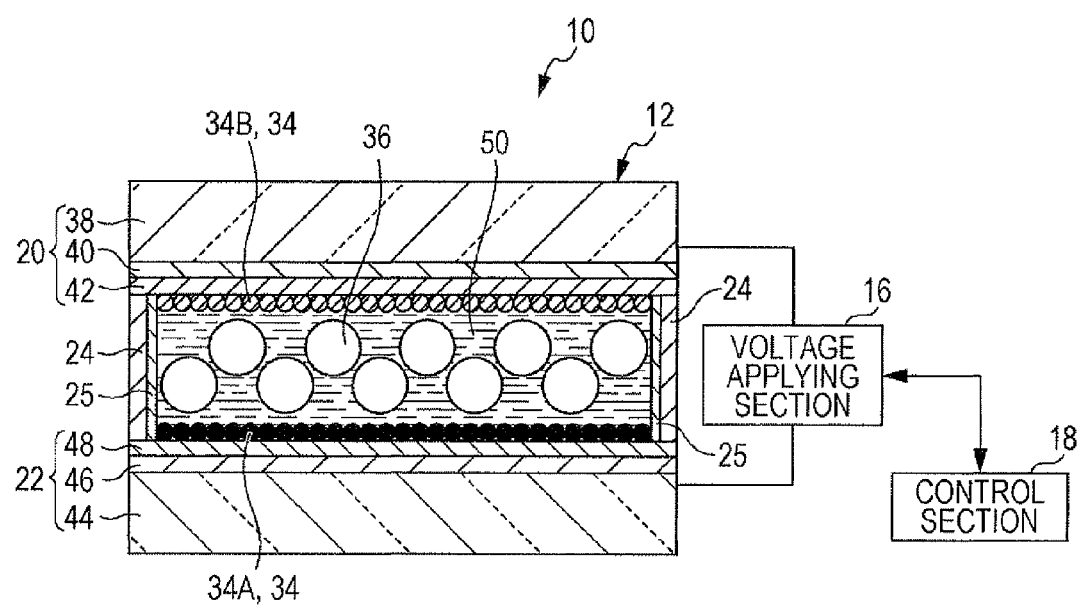
FIG. 1 is a schematic configuration diagram of a display device according to a first exemplary embodiment.

Exemplary embodiments of the present invention are described with reference to the drawings. Members having the same operation and function are denoted by the same reference numeral in all drawings, and duplicate description may be omitted.

Figure 2A:
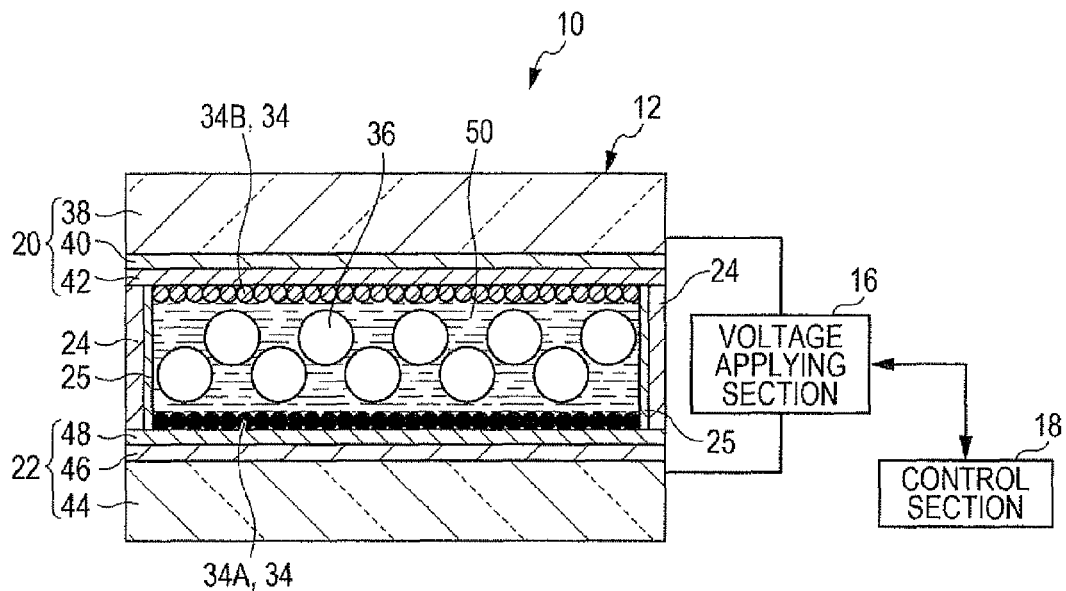
FIGS. 2A and 2B are explanatory views each schematically showing a migration state of a migrating particle group when a voltage is applied between substrates of a display medium in a display device according to a first exemplary embodiment.
Figure 2B:
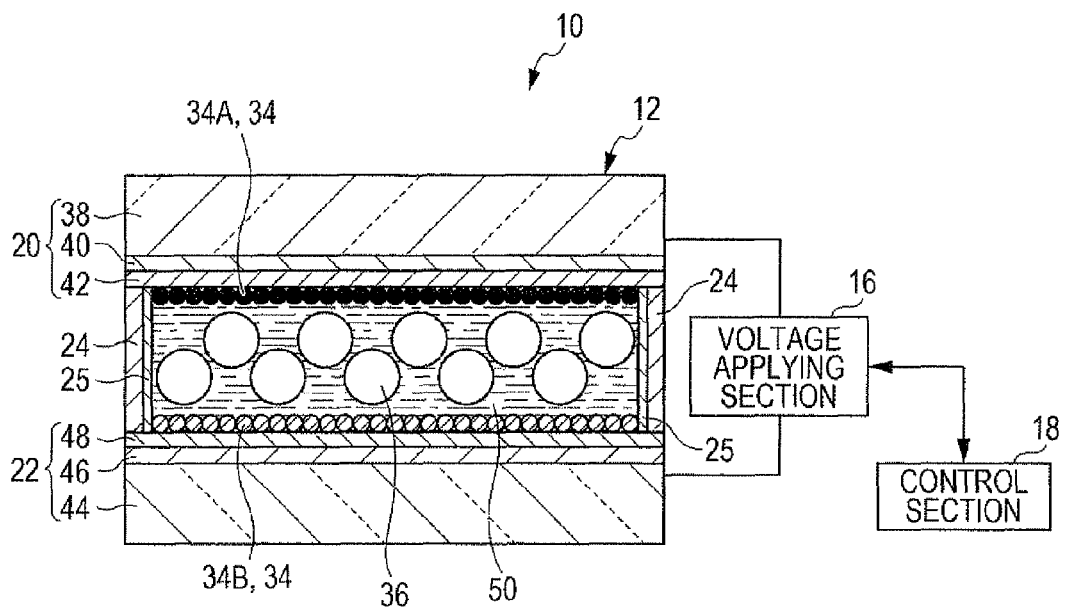

FIG. 1 is a schematic configuration diagram of a display device according to an exemplary embodiment. FIGS. 2A and 2B are explanatory views each schematically showing a migration state of a migrating particle group when a voltage is applied between substrates of a display medium in a display device according to an exemplary embodiment.

As shown in FIG. 1, a display device 10 according to an exemplary embodiment includes a display medium 12, a voltage applying section 16 that applies a voltage to the display medium 12, and a control section 18.

The display medium 12 includes a display substrate 20 serving as an image display plane, a back substrate 22 facing the display substrate 20 with a space therebetween, a space member 24 that holds a specified space between the substrates and that partitions the space between the display substrate 20 and the back substrate 22 into plural cells, and a reflecting particle group 36 having a different optical reflection characteristic from that of a migrating particle group 34 sealed in each of the cells.

Each of the cells refers to a region surrounded by the display substrate 20, the back substrate 22 and the space member 24. The migrating particle group 34 and a dispersion medium 50 are sealed in each of the cells. The migrating particle group 34 includes plural migrating particles and is dispersed in the dispersion medium 50 so as to move through the gaps between reflection particles of the reflecting particle group 36 between the display substrate 20 and the back substrate 22 according to the intensity of an electric field formed in each of the cells.

As the migrating particle group 34, a migrating particle group 34A and a migrating particle group 34B that assumes a different color and has a different charge polarity from the migrating particle group 34A are used.

The space member 24 may be provided to correspond to each pixel when an image is displayed on the display medium 12, and the cells may be formed to correspond to respective pixels so that the display medium 12 is configured to display for each of the pixels.

For the sake of simple description, the exemplary embodiment is described with reference to the drawings for one cell. Hereinafter, each component is described in detail.

First, the pair of substrates is described.

The display substrate 20 includes a surface electrode 40 and a surface layer 42 laminated in order on a support substrate 38. The back substrate 22 includes a back electrode 46 and a surface layer 48 laminated in order on a support substrate 44.

The display substrate 20 or both the display substrate 20 and the back substrate 22 have translucency. Here, in the exemplary embodiment, "translucency" represents that a visible light transmittance is 60% or more.

The support substrate is described.

Examples of materials for the support substrate 38 and the support substrate 44 include glass and plastics such as polyethylene terephthalate resins, polycarbonate resins, acryl resins, polyimide resins, polyester resins, epoxy resins, polyether sulphone resins, and the like.

The electrodes are described.

Examples of materials for the surface electrode 40 and the back electrode 46 include oxides of indium, tin, cadmium, antimony, and the like; compound oxides such as ITO and the like; metals such as gold, silver, copper, nickel, and the like; and organic materials such as polypyrrole, polythiophene, and the like. The surface electrode 40 and the back electrode 46 may be made of any one of a single-layer film, a mixed film, and a composite film of these materials. The thickness of the surface electrode 40 and the back electrode 46 is preferably, for example, 100 Å or more and 2000 Å or less. The back electrode 46 and the surface electrode 40 may be formed in, for example, a matrix shape or a stripe shape.

In addition, the surface electrode 40 may be buried in the support substrate 38, and the back electrode 46 may be buried in the support substrate 44. In this case, the material of the support substrate 38 and the support substrate 44 is selected according to the composition of each of the migrating particles in the migrating particle group 34, and the like.

The back electrode 46 and the surface electrode 40 may be disposed to separate from the display substrate 20 and the back substrate 22, respectively, outside the display medium 12.

Although, in the above description, the electrodes (the surface electrode 40 and the back electrode 46) are provided on both the display substrate 20 and the back substrate 22, an electrode may be provided on any one of the substrates so as to perform active matrix drive.

In addition, TFT (thin-film transistor) may be provided for each pixel of the support substrate 38 and the support substrate 44 in order to perform active matrix drive. TFT is preferably provided on the back substrate 22, not the display substrate 20.

The surface layers are described.

The surface layer 42 and the surface layer 48 are provided on the facing surfaces of the display substrate 20 and the back substrate 22. Also, a surface layer 25 is provided on the surface (inner surface of each cell) of the space member 24.

In this exemplary embodiment, description is made of the case in which the surface layers are provided on the facing surfaces of the display substrate 20 and the back substrate 22. However, a surface layer may be provided on only any one of the facing surfaces of the display substrate 20 and the back substrate 22. From the viewpoint of suppression of image defects due to adhesion of migrating particles, it is desirable to provide the surface layer 42 on the opposing surface on at least the display substrate 20 side. In addition, when the surface layer 25 is provided on the surface (inner surface of each cell) of the space member 24, adhesion of the migrating particles to the space member 24 is suppressed as compared with the case in which the surface layer 25 is not provided on the space member 24. As a result, an increase in migrating particles which do not contribute to display is suppressed. Namely, it is desirable to provide the surface layer 42 on the opposing surface on at least the display substrate 20 side and most desirable to provide the surface layers on all the pair of substrates and the space member (i.e., the inner walls of the cells surrounded by the substrates and the space member).

Each of the surface layers 42, 48, and 25 is composed of a polymer compound having a silicone chain. Specifically, for example, each of the surface layers 42, 48, and 25 is formed by forming the polymer compound having a silicone chain on each of the facing surfaces by treatment of chemically bonding the polymer compound having a silicone chain to each of the facing surfaces of the display substrate 20 and the back substrate 22 and the facing surfaces of the space member 24, or treatment of coating each of the facing surfaces with a polymer compound having a silicone chain (i.e., forming a film of the polymer compound).

As the polymer compound having a silicone chain, a copolymer containing the following constitutional unit (A) and constitutional unit (B) is used.

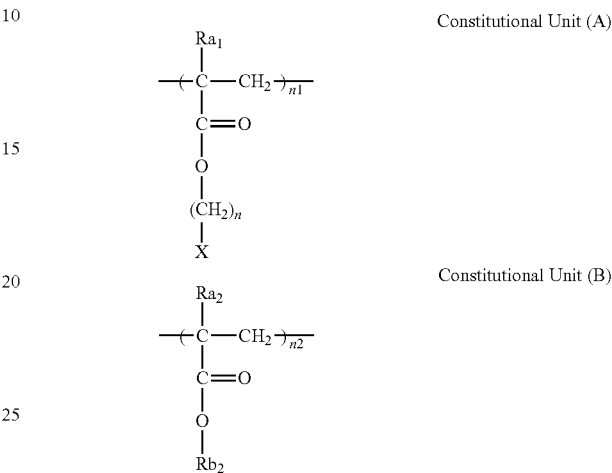

In the constitutional units (A) and (B), X represents a group containing a silicone chain, $Ra_1$ and $Ra_2$ each independently represent a hydrogen atom or a methyl group, $Rb_2$ represents an organic group containing a fluorine atom, n1 and n2 each represent mol % of the constitutional unit relative to the whole copolymer and satisfy $0<n1<50$ and $0<n2<50$, respectively, and n represents a natural numeral of 1 or more and 3 or less.

A group containing a silicone chain and represented by X in the constitutional units (A) and (B) is, for example, a group containing a straight or branched silicone chain (siloxane chain in which two or more Si—O bonds are linked), preferably a group containing a dimethylsiloxane chain in which two or more dimethylsiloxane structures (—Si(CH$_3$)$_2$—O—) are linked and a portion (a portion of —CH$_3$) may be substituted by a substituent.

Specific examples of a group containing a silicone chain and represented by X include groups represented by the following structural formulae (X1) and (X2):

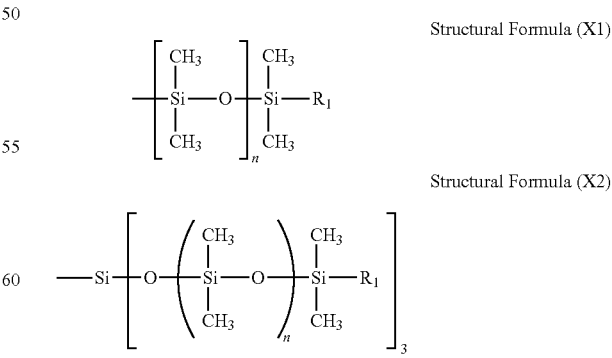

In the structural formulae (X1) and (X2), $R_1$ represents a hydroxyl group, a hydrogen atom, or an alky group having 1 to 10 carbon atoms, and n represents an integer of 1 to 1000.

In the structural formulae (X1) and (X2), an alkyl group represented by $R_1$ is an alkyl group having 1 to 10 carbon atoms, preferably an alkyl group having 1 to 4 carbon atoms, and more preferably a methyl group.

n is an integer of 1 to 1000, preferably 2 to 200, and more preferably 5 to 100.

Examples of an organic group having a fluorine atom and represented by $Rb_2$ in the constitutional unit (B) include an aliphatic group having a fluoroalkyl group, an aromatic group having a fluoroalkyl group, an aromatic group substituted by a fluorine atom, and the like.

Specific examples of an organic group having a fluorine atom and represented by $Rb_2$ include $-(CH_2)_{m1}-(CF_2)_{m2}-Rb_{21}$ (wherein m1 represents a natural number of 0 to 4, m2 represents a natural number of 0 to 20, and $Rb_{21}$ represents $-CH_2F$, $-CHF_2$, or $-CF_3$ group).

m1 represents a natural number of 0 to 4, preferably a natural number of 0 to 3, and more preferably 1 to 2.

m2 represents a natural number of 0 to 20, preferably a natural number of 0 to 10, and more preferably 0 to 7.

$Rb_{21}$ represents $-CH_2F$, $-CHF_2$, or $-CF_3$ group, and preferably $-CHF_2$ or $-CF_3$ group.

The alkyl group represented by each of the characters may be a straight chain or branched. Specific examples thereof include a methyl group, an ethyl group, an isopropyl group, a butyl group, an isopentyl group, an amyl group, a hexyl group, a cyclohexyl group, an octyl group, an ethylhexyl group, an isononyl group, a decyl group, and the like. The alkyl group is selected according to a target carbon number.

In the constitutional units (A) and (B), n1 and n2 have the relations of $0<n1<50$ and $0<n2<50$, preferably the relations of $0<n1<20$ and $0<n2<20$, and more preferably the relations of $0<n1<10$ and $0<n2<10$, respectively.

In the constitutional units (A) and (B), n represents a natural number of 1 to 3.

Specific examples of a monomer constituting the constitutional unit (A) in the polymer compound having a silicone chain include a dimethylsilicone monomer having a (meth) acrylate group at one end (for example, Silaplane: FM-0711, FM-0721, and FM-0725 manufactured by Chisso Corporation, and X-22-174DX, X-22-2426, and X-22-2475 manufactured by Shinetsu Silicone Co., Ltd.). Among these, Silaplane: FM-0711, FM-0721, and FM-0725 are desired.

Specific examples of a monomer constituting the constitutional unit (B) include 2,2,2-trifluoroethyl methacrylate, 3,3,4,4,5,5,6,6,7,7,8,8,9,9,10,10,10-heptadecafluorodecyl methacrylate, 1H,1H,5H-octafluoropentyl methacrylate, and the like.

The polymer compound having a silicone chain may be a copolymer containing another constitutional unit (C) together with the constitutional units (A) and (B). When the polymer compound contains the other constitutional unit (C) as a constitutional unit of a copolymer, the film forming properties of the surface layer are secured, and film deterioration by the dispersion medium is suppressed.

Examples of a monomer constituting the other constitutional unit (C) include (meth)acrylates having aliphatic amino groups, such as N,N-dimethylaminoethyl (meth)acrylate, N,N-diethylaminoethyl(meth)acrylate, N,N-dibutylaminoethyl (meth)acrylate, N,N-hydroxyethylaminoethyl (meth)acrylate, N-ethylaminoethyl(meth)acrylate, N-octyl-N-ethylaminoethyl (meth)acrylate, N,N-dihexylaminoethyl (meth)acrylate, and the like; acrylamides such as N-methylacrylamide, N-octylacrylamide, N-phenylmethylacrylamide, N-cyclohexylacrylamide, N-phenylacrylamide, N-p-methoxy-phenylacrylamide, N,N-dimethylacrylamide, N,N-dibutylacrylamide, N-methyl-N-phenylacrylamide, and the like; aromatic substituted ethylene monomers having nitrogen-containing groups, such as dimethylaminostyrene, diethylaminostyrene, dimethylaminomethylstyrene, dioctylaminostyrene, and the like; nitrogen-containing vinyl ether monomers, such as vinyl-N-ethyl-N-phenyl aminoethyl ether, vinyl-N-butyl-N-phenyl aminoethyl ether, triethanolamine divinyl ether, vinyldipheyl aminoethyl ether, N-vinylhydroxyethyl benzamide, m-aminophenyl vinyl ether, and the like;

pyrroles such as N-vinylpyrrole and the like; pyrrolines such as N-vinyl-2-pyrroline N-vinyl-3-pyrroline, and the like; pyrrolidines such as N-vinylpyrrolidine, vinylpyrrolidine aminoether, N-vinyl-2-pyrrolidone, and the like; imidazoles such as N-vinyl-2-methylimidazole and the like; imidazolines such as N-vinylimidazoline and the like; indoles such as N-vinylindole and the like; indolines such as N-vinylindoline and the like; carbazoles such as N-vinylcarbazole, 3,6-dibromo-N-vinylcarbazole, and the like; pyridines such as 2-vinylpyridine, 4-vinylpyridine, 2-methyl-5-vinylpyrodine, and the like; piperidines such as (meth) acrylpiperidine, n-vinylpiperidone, N-vinylpiperazine, and the like; quinolines such as 2-vinylquinoline, 4-vinylquinoline, and the like; pyrazoles such as N-vinylpyrazole, N-vinylpyrazoline, and the like; oxazoles such as 2-vinyloxazole and the like; oxazines such as 4-vinyloxazine, morpholinoethyl (meth)acrylate, and the like;

acrylic acid, methacrylic acid, crotonic acid, itaconic acid, maleic acid, fumaric acid, and citraconic acid or anhydrides, and monoalkyl esters, and carboxyl group-containing vinyl ethers thereof, such as carboxyethyl vinyl ether and carboxypropyl vinyl ether; styrenesulfonic acid, 2-acrylamido-2-methylpropanesulfonic acid, 3-sulfopropyl (meth)acrylic acid esters, bis-(3-sulfopropyl)-itaconic acid esters, and the like, and salts thereof; sulfuric acid monoesters of 2-hydroxyethyl(meth)acrylic acid and salts thereof; vinylphosphonic acid, vinyl phosphate, acid phosphoxyethyl(meth)acrylate, acid phosphoxypropyl (meth)acrylate, bis(methacryloxyethyl) phosphate, diphenyl-2-methacryloyloxyethyl phosphate, diphenyl-2-acryloyloxyethyl phosphate, dibutyl-2-methacryloyloxyethyl phosphate, dibutyl-2-acryloyloxylethyl phosphate, dioctyl-2-(meth) acryloyloxyethyl phosphate, and the like.

Other examples of a monomer constituting the other constitutional unit (C) include (meth)acrylonitrile, (meth)acrylic acid alkyl esters, (meth)acrylamide, ethylene, propylene, butadiene, isoprene, isobutylene, N-dialkyl-substituted (meth)acrylamides, styrene, vinyl carbazole, styrene derivatives, polyethylene glycol mono(meth)acrylate, vinyl chloride, vinylidene chloride, isoprene, butadiene, vinylpyrrolidone, hydroxyethyl(meth)acrylate, hydroxybutyl (meth) acrylate, and the like.

Preferred examples of a monomer constituting the other constitutional unit (C) include hydroxyethyl methacrylate, methyl methacrylate, 1-vinyl-2-pyrrolidone, and the like.

In the description, the expression "(meth)acrylate" or the like includes "acrylate" and "methacrylate".

When the polymer compound having a silicone chain is a copolymer containing the other constitutional unit (C) together with the constitutional units (A) and (B), mol % (denoted by n3) of the other constitutional unit (C) based on the whole copolymer is, for example, $0<n3<99$ and preferably $10<n3<97$.

In the polymer compound having a silicone chain, ratio of the constitutional unit (A) to the constitutional unit (B) (mass ratio: constitutional unit (A)/constitutional unit (B)) is, for example, 1/99 or more and 99/1 or less, preferably 5/95 or more and 95/1 or less, and more preferably 10/90 or more and 90/10 or less.

When the polymer compound having a silicone chain contains the other constitutional unit (C), the polymerization ratio (mass ratio: (constitutional unit (A)+constitutional unit (B))/other constitutional unit (C)) of the total of the constitutional unit (A) and the constitutional unit (B) to the other constitutional unit (C) is, for example, 10/90 or more and 90/10 or less, preferably 15/85 or more and 85/15 or less, and more preferably 20/80 or more and 80/20 or less.

Specific examples of the polymer compound having a silicone chain include compounds given below but are not limited to these compounds.

The specific examples given below are examples of the polymer compound further containing the other constitutional unit (C).

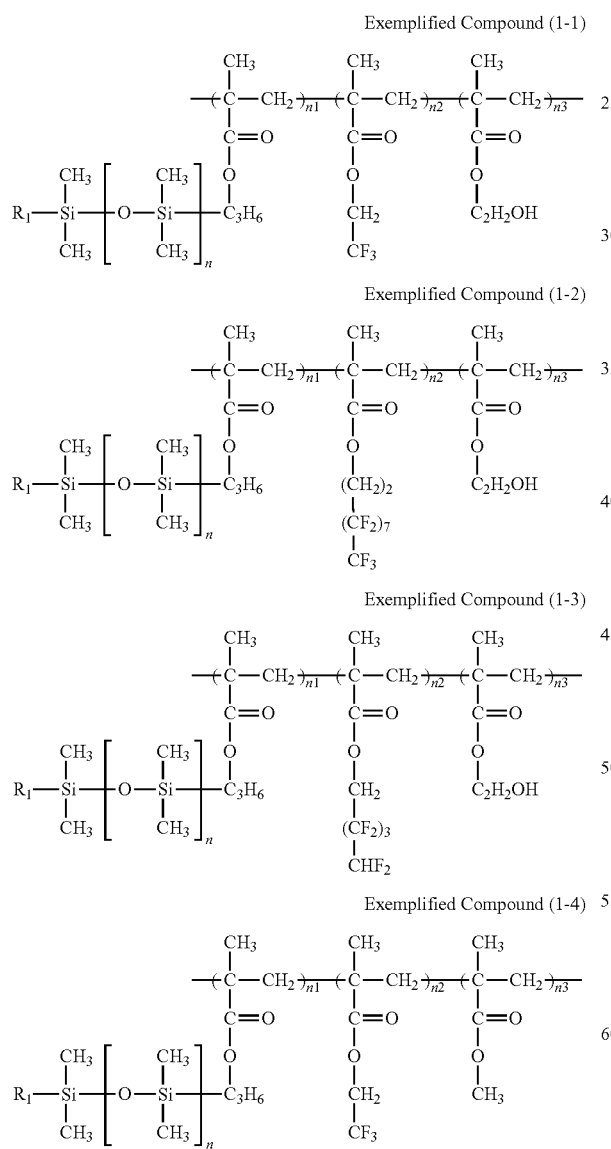

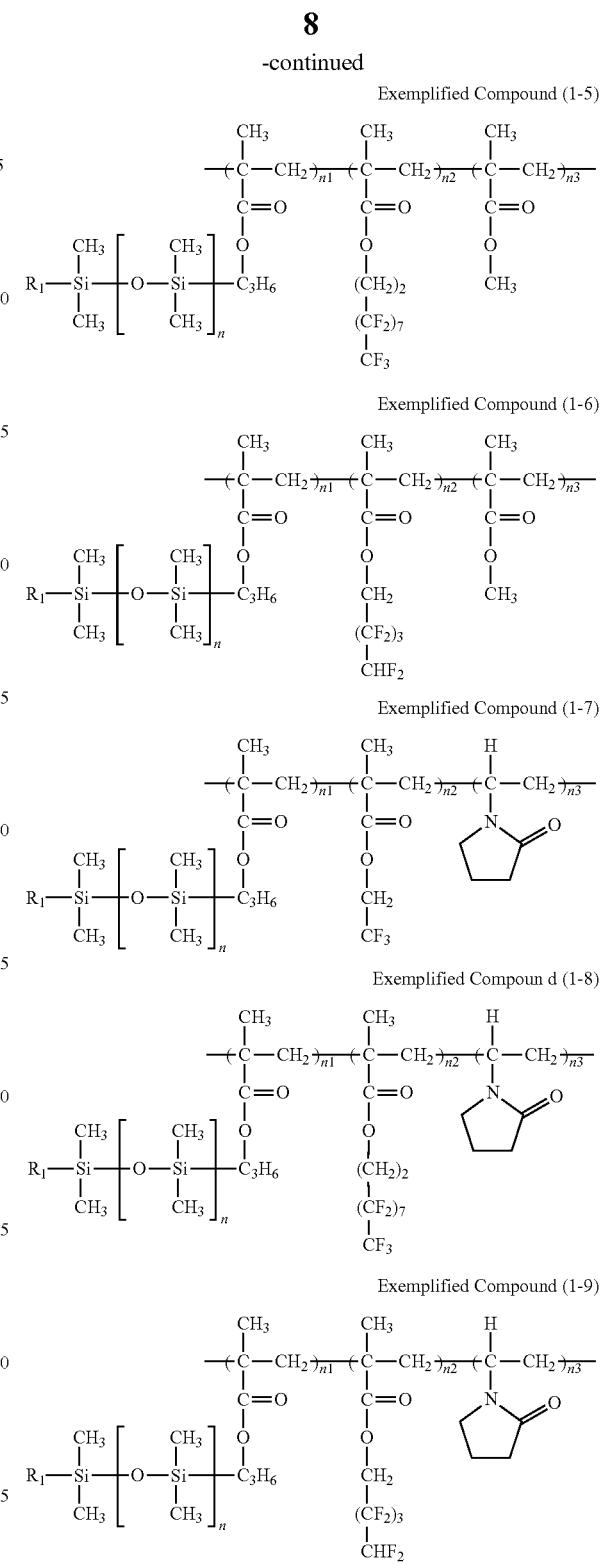

Examples of a terminal group of the polymer compound having a silicone chain include a hydroxyl group, a methyl group, an alkyl group, a carboxyl group, and the like.

The weight-average molecular weight of the polymer compound having a silicone chain is preferably 100 or more and 1,000,000 or less, more preferably 400 or more and 1,000,000 or less.

The weight-average molecular weight is measured by a static light scattering method or size-exclusion column chromatography, and a value described in the specification is measured by this method.

The thickness of the surface layers (the surface layers 42, 48, and 25) composed of the polymer compound having a silicone chain is, for example, 0.001 µm or more and 10 or less, and preferably 0.01 µm or more and 1 µm or less.

The space member is described.

The space member 24 provided for maintaining the space between the display substrate 20 and the back substrate 22 is composed of, for example, a thermoplastic resin, a thermosetting resin, an electron ray curable resin, a photocurable resin, rubber, a metal, or the like.

The space member 24 may be integrated with any one of the display substrate 20 and the back substrate 22. In this case, the space member 24 is formed by etching or laser-beam machining of the support substrate 38 or 44 or pressing or printing of the support substrate 38 or 44 using a previously formed pattern.

In this case, the space member 24 is formed on one or both of the display substrate 20 side and the back substrate 22 side.

The space member 24 may be colored or colorless but is colorless and transparent. In this case, the space member 24 is composed of a transparent resin such as polystyrene, polyester, acryl, or the like.

The granular space member 24 is also transparent, and particles of a transparent resin such as polystyrene, polyester, acryl, or the like, or galls particles are used.

The term "transparent" represents having a visible light transmittance of 60% or more.

The dispersion medium is described.

The dispersion medium 50 in which the migrating particle group 34 is dispersed is an insulating liquid.

Here, "insulating" represents a volume resistivity of $10^{11}$ Ωcm or more. This applies to description below.

Specific examples of the insulating liquid include hexane, cyclohexane, toluene, xylene, decane, hexadecane, kerosene, paraffin, isoparaffin, silicone oil, high-purity petroleum, ethylene glycol, alcohols, ethers, esters, dimethylformamide, dimethylacetamide, dimethyl sulfoxide, 1-methyl-2-pyrrolidone, N-methylformamide, acetonitrile, tetrahydrofuran, propylene carbonate, ethylene carbonate, benzine, diisopropylnaphthalene, olive oil, trichlorotrifluoroethane, tetrachloroethane, dibromotetrafluoroethane, and the like; and mixtures thereof. Among these, silicone oil is desirably used. By using silicone oil, the silicone chain of the polymer compound constituting the surface layers is liable to be present on the dispersion medium 50 side, thereby improving the effect of suppressing particle adhesion.

In addition, water (so-called pure water) from which impurities are removed to achieve a volume resistivity described below is also used as the dispersion medium 50. The volume resistivity is preferably $10^3$ Ωcm or more, more preferably $10^7$ Ωcm or more and $10^{19}$ Ωcm or less, and still more preferably $10^{10}$ Ωcm or more and $10^{19}$ Ωcm or less. With a volume resistivity within this range, an electric field is more effectively applied to the migrating particle group 34, and the occurrence of bubbles due to electrolysis of a liquid by electrode reaction is suppressed, thereby decreasing deterioration in migration characteristics of the migrating particles at each time of current application and imparting excellent repetition stability.

According to demand, an acid, an alkali, a salt, a dispersion stabilizer, a stabilizer for anti-oxidation and ultraviolet absorption, an antibacterial agent, a preservative agent, and the like may be added to the insulating liquid, but such agents are added so that the volume resistivity is within the above specified range.

Further, an anionic surfactant, a cationic surfactant, an amphoteric surfactant, a nonionic surfactant, a fluorine-based surfactant, a silicone surfactant, metal soap, an alkyl phosphate, succinic acid imide, or the like may be added to the insulating liquid.

Specific examples of ionic and nonionic surfactants include the following: Examples of the nonionic surfactant include polyoxyethylene nonylphenyl ether, polyoxyethylene octylphenyl ether, polyoxyethylene dodecylphenyl ether, polyoxyethylene alkyl ethers, polyoxyethylene fatty acid esters, sorbitan fatty acid esters, polyoxyethylene sorbitan fatty acid esters, fatty acid alkylolamides, and the like. Examples of the anionic surfactant include alkylbenzenesulfonic acid salts, alkylphenylsulfonic acid salts, alkylnaphthalenesulfonic acid salts, higher fatty acid salts, sulfuric acid ester salts of higher fatty acid esters, sulfonic acid ester salts of higher fatty acid esters, and the like. Examples of the cationic surfactant include primary or tertiary amine salts, quaternary ammonium salts, and the like. The amount of such a charge control agent is preferably 0.01% by mass or more and 20% by mass or less, particularly preferably 0.05% by mass or more and 10% by mass or less, based on the particle solid content. When the amount is less than 0.01% by mass, the desired charge control effect is insufficient, while when the amount exceeds 20% by mass, the conductivity of a developer may be excessively increased, thereby causing difficulty in use.

As the dispersion medium 50, a polymeric resin may be combined with the insulating liquid. As the polymeric resin, a high-molecular gel, a high-molecular polymer, or the like may be used.

Examples of the polymeric resin include high-molecular gels derived from natural polymers, such as agarose, agaropectin, amylose, sodium alginate, propylene glycol alginate, isolichenan, insulin, ethyl cellulose, ethylhydroxyethyl cellulose, curdlan, casein, carrageenan, carboxymethyl cellulose, carboxymethyl starch, callose, agar, chitin, chitosan, silk fibroin, guar gum, quince seed, crown gall polysaccaride, glycogen, glucomannan, keratan sulfate, keratin protein, collagen, cellulose acetate, gellan gum, sizofuran, gelatin, ivory palm mannan, tunicin, dextran, dermatan sulfate, starch, tragacanth gum, nigeran, hyaluronic acid, hydroxyethyl cellulose, hydroxypropyl cellulose, pustulan, funoran, decomposed xyloglucan, pectin, porphyran, methyl cellulose, methyl starch, laminaran, lichenan, lentinan, locust bean gum, and the like; and almost all high-molecular gels of synthetic polymers.

Further, a polymer containing, in its repeat unit, a functional group such as an alcohol, a ketone, an ether, an ester, or an amide may be used. Examples of such a polymer include polyvinyl alcohol, poly(meth)acrylamide and derivatives thereof, polyvinyl pyrrolidone, polyethylene oxide, and copolymers of these polymers.

Among these, from the viewpoint of production stability, electrophoretic properties, and the like, gelatin, polyvinyl alcohol, poly(meth)acrylamide, or the like is preferably used.

In addition, when a coloring agent below is mixed with the dispersion medium 50, a color different from that of the migrating particle group 34 is displayed on the display medium 12. For example, when the color of the migrating particle group 34 is black, white and black colors are displayed on the display medium 12 by mixing the coloring agent that exhibits while color.

Examples of the coloring agent mixed with the dispersion medium 50 include known coloring agents such as carbon black, titanium oxide, magnesium oxide, zinc oxide, phthalocyanine copper-based cyan colorants, azo-based yellow colorants, azo-based magenta colorants, quinacridone-based magenta colorants, red colorants, green colorants, blue colorants, and the like. Specifically, typical examples thereof include aniline blue, chalcoil blue, chrome yellow, ultramarine blue, Dupont oil red, quinoline yellow, methylene blue chloride, phthalocyanine blue, malachite green oxalate, lamp black, rose bengal, C. I. Pigment Red 48:1, C. I. Pigment Red 122, C. I. Pigment Red 57:1, C. I. Pigment Yellow 97, C. I. Pigment Blue 15:1, C. I. Pigment Blue 15:3, and the like.

The migrating particle group 34 moves in the dispersion medium 50. If the viscosity of the dispersion medium 50 is excessively high, the force acting on the back surface 22 and the display substrate 20 greatly varies, thereby failing to determine a threshold of movement of the particles (migration of the particles) according to an electric field. Therefore, the viscosity of the dispersion medium 50 may be controlled.

The viscosity of the dispersion medium 50 in an environment at a temperature of 20° C. may be 0.1 mPa·s or more and 100 mPa·s or less, preferably 0.1 mPa·s or more and 50 mPa·s or less, and more preferably 0.1 mPa·s or more and 20 mPa·s or less, from the viewpoint of the moving speed (migration speed) of the migrating particles, i.e., the display rate.

By adjusting the viscosity of the dispersion medium 50 to be in the range of 0.1 mPa·s or more and 100 mPa·s or less, variations in the adhesive force between the migrating particle group 34 dispersed in the dispersion medium 50 and the display substrate 20 or the back substrate 22, the flow resistance, and the electrophoresis time are suppressed.

The viscosity of the dispersion medium 50 is adjusted by, for example, regulating the molecular weight, structure, composition, and the like of the dispersion medium. The viscosity is measured with a B-8L viscometer manufactured by Tokyo Keiki Inc.

Next, the migrating particle group is described. The migrating particle group 34 includes plural migrating particles, and each of the migrating particles is charged positively or negatively. When a predetermined voltage is applied between the surface electrode 40 and the back electrode 46 (i.e., between the display substrate 20 and the back substrate 22), an electric field of a predetermined strength or more is formed between the display substrate 20 and the back substrate 22, and consequently the migrating particles move in the dispersion medium 50.

A change in display color in the display medium 12 is caused by the movement of migrating particles constituting the migrating particle group 34.

Examples of the migrating particles of the migrating particle group 34 include glass beads, insulating metal oxide particles of alumina, titanium oxide, and the like, thermoplastic or thermosetting resin particles, the resin particles containing a coloring agent fixed to the surfaces thereof, particles of thermoplastic or thermosetting resin containing a coloring agent, metal colloid particles having a plasmon coloring function, and the like.

Examples of a thermoplastic resin used for producing the migrating particles include homopolymers or copolymers of styrenes such as styrene, chlorostyrene, and the like; monoolefins such as ethylene, propylene, butylene, isoprene, and the like; vinyl esters such as vinyl acetate, vinyl propionate, vinyl benzoate, vinyl butyrate, and the like; α-methylene aliphatic monocarboxylic acid esters such as methyl acrylate, ethyl acrylate, butyl acrylate, dodecyl acrylate, octyl acrylate, phenyl acrylate, methyl methacrylate, ethyl methacrylate, butyl methacrylate, dodecyl methacrylate, and the like; vinyl ethers such as vinyl methyl ether, vinyl ethyl ether, vinyl butyl ether, and the like; vinyl ketones such as vinyl methyl ketone, vinyl hexyl ketone, vinyl isopropenyl ketone, and the like.

Examples of a thermosetting resin used for producing the migrating particles include cross-linked resins such as cross-linked copolymers composed of divinyl benzene as a main component, cross-linked polymethyl methacrylate, and the like, phenol resins, urea resins, melamine resins, polyester resins, silicone resins, and the like. Particularly typical binder resins include polystyrene, styrene-alkyl acrylate copolymers, styrene-alkyl methacrylate copolymers, styrene-acrylonitrile copolymers, styrene-butadiene copolymers, styrene-maleic anhydride copolymers, polyethylene, polypropylene, polyesters, polyurethane, epoxy resins, silicone resins, polyamides, modified rosin, paraffin wax, and the like.

As the coloring agent, an organic or inorganic pigment, an oil-soluble dye, or the like may be used. Examples thereof include known coloring agents such as magnetic powders of magnetite, ferrite, and the like, carbon black, titanium oxide, magnesium oxide, zinc oxide, copper phthalocyanine-based cyan coloring agents, azo yellow coloring agents, azo magenta coloring agents, quinacridone magenta coloring agents, red coloring agents, green coloring agents, blue coloring agents, and the like. Specifically, typical examples thereof include aniline blue, chalcoil blue, chrome yellow, ultramarine blue, Dupont oil red, quinoline yellow, methylene blue chloride, phthalocyanine blue, malachite green oxalate, lamp black, rose bengal, C. I. Pigment Red 48:1, C. I. Pigment Red 122, C. I. Pigment Red 57:1, C. I. Pigment Yellow 97, C. I. Pigment Blue 15:1, C. I. Pigment Blue 15:3, and the like.

The resin of the migrating particles may be mixed with a charge control agent according to demand. Examples s charge control agent include known charge control agents used for electrophotographic toner materials, such as cetylpyridyl chloride, quaternary ammonium salts such as BONTRON P-51, BONTRON P-53, BONTRON E-84, and BONTRON E-81 (manufactured by Orient Chemical Industries Co., Ltd.), and the like, salicylic acid metal complexes, phenol condensates, tetraphenyl compounds, metal oxide particles, metal oxide particles that are surface-treated with various coupling agents, and the like.

A magnetic material may be mixed in the migrating particles or the surfaces thereof. As the magnetic material, a color-coated inorganic magnetic material or organic magnetic material is used according to demand. A transparent magnetic material, particularly a transparent organic magnetic material, may be used because it does not inhibit the color development of a coloring pigment and has a smaller specific gravity than that of an inorganic magnetic material.

As a colored magnetic powder, a colored magnetic powder having a small particle diameter described in, for example, Japanese Unexamined Patent Application Publication No. 2003-131420 may be used. A colored magnetic powder including magnetic particles as nuclei and colored layers laminated on the surfaces of the magnetic particles is used. A colored layer formed by opaquely coloring a magnetic powder with a pigment or the like may be selected, but, for example, a light interference thin film may be used. The light interference thin film is a thin film composed of an achromatic material, such as $SiO_2$, $TiO_2$, or the like, and having a thickness equal to the wavelength of light, so that light is wavelength-selectively reflected by light interference within the thin film.

An external additive may be adhered to the surfaces of the migrating particles. The external additive is transparent so as not to influence the color of the migrating particles.

As the external additive, inorganic particles of a metal oxide such as silicon oxide (silica), titanium oxide, alumina, or the like are used. In order to control the chargeability, mobility, and environment dependence of the particles, the particles may be surface-treated with a coupling agent or silicone oil.

Examples of the coupling agent include positively chargeable coupling agents such as aminosilane coupling agents, aminotitanium coupling agents, nitrile coupling agents, and the like; negatively chargeable coupling agents such as silane coupling agents, titanium coupling agents, epoxysilane coupling agents, acrylsilane coupling agents, and the like, which do not contain nitrogen atoms (composed of atoms other than nitrogen). Examples of the silicone oil include positively chargeable silicone oil such as amino-modified silicone oil and the like; and negatively chargeable silicone oil such as dimethyl silicone oil, alkyl-modified silicone oil, α-methyl-sulfone-modified silicone oil, methylphenyl silicone oil, chlorophenyl silicone oil, fluorine-modified silicone coil and the like. The external additive is selected according to desired resistance.

Among the above-described external additives, well known hydrophobic silica and hydrophilic titanium oxide are desired, and particularly a titanium compound produced by reaction of $TiO(OH)_2$ and a silane compound such as a silane coupling agent as described in Japanese Unexamined Patent Application Publication No. 10-3177 is desired. As the silane compound, any type of chlorosilane, alkoxysilane, silazane, and a special silylating agent may be used. The titanium compound is produced by reacting $TiO(OH)_2$ formed in a wet process with the silane compound or silicone oil and drying the product. Since the titanium compound is not subjected to a firing process at several hundred degrees, Ti strong bonds are not formed and the migrating particles are in a primary particle state without aggregation. Further, since $TiO(OH)_2$ is reacted directly with the silane compound or silicone oil, the amount of treatment with the silane compound or silicone oil may be increased, and thus charging properties may be controlled by adjusting the amount of treatment with the silane compound, and the chargeability imparted is more improved than usual titanium oxide.

The primary particles of the external additive generally have a size of 1 nm or more and 100 nm or less, preferably 5 nm or more and 50 nm or less, but the size is not limited to this.

The mixing ratio of the external additive to the migrating particles is adjusted in view of balance between the particle diameter of the migrating particles and the particle diameter of the external additive. When the amount of the external additive added is excessively large, at least a portion of the external additive is separated from the surfaces of the migrating particles and adheres to the surfaces of the other migrating particles, failing to achieve desired charge characteristics. The amount of the external additive is generally 0.01 part by mass or more and 3 parts by mass or less and preferably 0.05 part by mass or more and 1 part by mass or less based on 100 parts by mass of the migrating particles.

The external additive may be added to any one of plural types of migrating particles or added to plural types or all types of migrating particles. When the external additive is added to the surfaces of all migrating particles, the external additive is inserted into the surfaces of the migrating particles by applying impact force or the external additive is strongly adhered to the surfaces of the migrating particles by heating the surfaces of the migrating particles. As a result, the external additive is prevented from separating from the migrating particles, and aggregates of the external additive, which are difficult to separate with an electric field, are prevented from being formed due to strong aggregation of the external additive with heteropolarity, thereby preventing deterioration in image quality.

As a method for forming the migrating particle group 34, any usual known method may be used. An example of a usable method which is used includes, as described in Japanese Unexamined Patent Application Publication No. 7-325434, weighing a resin, a pigment, and a charge control agent at an intended mixing ratio, melting the resin by heating, adding and mixing the pigment with the melted resin, dispersing the pigment in the melted resin, cooling the mixture, preparing particles with a mill such as a jet mill, a hammer mill, a turbo mill, or the like, and dispersing the resultant particles in a dispersion medium. Alternatively, particles containing a charge control agent may be prepared by a polymerization method such as suspension polymerization, emulsion polymerization, dispersion polymerization, or the like or a coacervation, melt dispersion, or emulsion aggregation method, and then dispersed in a dispersion medium to prepare a particle dispersion medium. Further, when the resin has plasticity, a particle forming method uses a proper apparatus for dispersing and kneading raw materials such as the resin, a coloring agent, a charge control agent, and a dispersion medium at a low temperature at which the dispersion medium does not boil and which is lower than the decomposition point of at least one of the resin, the charge control agent, and the coloring agent. Specifically, the pigment, the resin, and the charge control agent are melted in the dispersion medium using a planetary mixer, a kneader, or the like, and particles are produced by solidification/precipitation by cooling the melt mixture under stirring using the temperature dependence of the solvent solubility of the resin.

Another method may be used, in which the raw materials are placed in an appropriate vessel provided with a granular medium for dispersion and kneading, for example, an attritor or a heated vibrating mill such as a heated ball mill, and the raw materials are dispersed and kneaded in the vessel within a desired temperature range of, for example, 80° C. or more and 160° C. or less. As the granular medium, steel such as stainless steel or carbon steel, alumina, zirconia, silica, or the like may be used. In producing the migrating particles by this method, the raw materials which are previously put into a flowing state are further dispersed in the vessel using the granular medium, and then the dispersion medium is cooled to precipitate the resin containing the coloring agent from the dispersion medium. During cooling and after cooling, the granular medium continuously generates shear and/or impact while maintaining a moving condition, thereby further decreasing the particle size.

The content (content (% by mass) relative to the total mass in a cell) of the migrating particle group 34 is not particularly limited as long as a desired hue is obtained. For the display medium 12, it is effective to control the content according to the cell thickness (i.e., the distance between the display substrate 20 and the back substrate). Namely, in order to obtain a desired hue, the content decreases as the cell thickness increases, and the content increases as the cell thickness decreases. The content is generally 0.01% by mass or more and 50% by mass or less.

The reflecting particle group is described.

The reflecting particle group 36 include reflecting particles having different optical reflection characteristic from the migrating particle group 34 and functions as a reflecting member which displays a different color from that of the migrating particle group 34. In addition, the reflecting particle group 36 also has the function as a space member which allows movement between the display substrate 20 and the back substrate 22 without inhibiting the movement. Namely, the particles in the migrating particle group 34 migrate (move) from the back substrate 22 side to the display substrate 20 side or from the display substrate 20 side to the back substrate 22 side through the spaces in the reflecting particle group 36. As the color of the reflecting particle group 36, for example, while or black color may be selected so as to become a background color, but another color may be selected. Further, the reflecting particle group 36 may be an uncharged particle group (i.e., a particle group which does not move according to an electric field) or a charged particle group (i.e., a particle group which moves according to an electric field). In this exemplary embodiment, the case in which the reflecting particle group 36 is an uncharged particle group and is white in color is described, but the reflecting particle group 36 is not limited to this.

Examples of the particles of the reflecting particle group 36 include particles formed by dispersing a white pigment (e.g., titanium oxide, silicon oxide, zinc oxide, or the like) in a resin (e.g., polystyrene resin, polyethylene resin, polypropylene resin, polycarbonate resin, polymethyl methacrylate resin (PMMA), acryl resin, phenol resin, formaldehyde resin, or the like); particles of resins such as polystyrene, polyethylene, polyvinylnaphthalene, and the like. When particles other than white particles are used as the particles of the reflecting particle group 36, for example, the above-described resin particles including a pigment or dye of desired color may be used. The pigment or dye may be a general pigment or dye used for printing ink and color toner as long as it has RGB or YMC color.

The reflecting particle group 36 is sealed between the substrates by, for example, an ink jet method. When the reflecting particle group 36 is fixed, for example, the reflecting particle group 36 is sealed and then heated (and pressed according to demand) to melt the surface layers of the reflecting particle group 36 so as to maintain the spaces between the particles.

The size of the cells in the display medium 12 is closely related to resolution of the display medium 12, and the resolution of an image displayed on the display medium 12 increases as the cell size decreases. The cell length is generally about 10 μm or more and 1 mm or less in the planar direction of the display substrate 20 of the display medium 12.

To fix the display substrate 20 and the back substrate 22 with the space member 24 therebetween, a combination of bolts and nuts or a fixing method such as a clamp, a clip, a substrate fixing frame or the like may be used. Also, a fixing method such as an adhesive, heat melting, ultrasonic bonding, or the like may be used.

The display medium 12 configured as described above is used for image-storing and rewriting devices, for example, a bulletin board, a circular, an electronic blackboard, an advertisement, a signboard, a flashing indicator, an electronic paper, an electronic newspaper, an electronic book, a document sheet in common use as a copy machine and printer, and the like.

As described above, the display device 10 according to this exemplary embodiment includes the display medium 12, the voltage applying section 16 which applies a voltage to the display medium 12, and the control section 18 (refer to FIG. 1).

The voltage applying section 16 is electrically connected to the surface electrode 40 and the back electrode 46. In the exemplary embodiment, the case in which both the surface electrode 40 and the back electrode 46 are electrically connected to the voltage applying section 16 is described. However, one of the surface electrode 40 and the back electrode 46 may be grounded, and the other may be connected to the voltage applying section 16.

The voltage applying section 16 is connected to the control section 18 so as to give and receive signals.

The control section 18 may be configured as a micro computer including CPU (Central Processing Unit) that controls the operation of the whole device, RAM (Random Access Memory) in which various data is temporarily stored, and ROM (Read Only Memory) in which various programs such as a control program for controlling the whole device are previously stored.

The voltage applying section 16 is a voltage applying device for applying a voltage to the surface electrode 40 and the back electrode 46 and applies a voltage between the surface electrode 40 and the back electrode 46 according to control by the control section 18.

Next, the operation of the display device 10 is described. The operation is described according to the operation of the control section 18.

Here, description is made of the case in which in the migrating particle group 34 sealed in the display medium 12, the migrating particle group 34A is charged to negative polarity, and the migrating particle group 34B is charged to positive polarity. In addition, the dispersion medium 50 is transparent, and the reflecting particle group 36 is white. That is, in this exemplary embodiment, description is made of the case in which the display medium 12 displays a color exhibited by movement of the migrating particle group 34A and the migrating particle group 34B, and white color is displayed as a background color.

First, an initial operation signal is output to the voltage applying section 16 to apply a voltage for a specified time (T1) so that the surface electrode 40 serves as a negative electrode, and the back electrode 46 serves as a positive electrode. When a voltage of a threshold voltage or more, at which a concentration change is finished on the negative electrode, is applied between the substrates, the migrating particles constituting the migrating particle group 34A charged to negative polarity move to the back substrate 22 side and reach the back substrate 22 (refer to FIG. 2A). On the other hand, the migrating particles constituting the migrating particle group 34B charged to positive polarity move to the display substrate 20 side and reach the display substrate 20 (refer to FIG. 2A).

In this case, on a while background that is the color of the reflecting particle group 36, a color exhibited by the migrating particle group 34B is visually observed as the color of the display medium 12 from the display substrate 20 side. The migrating particle group 34A is shielded by the reflecting particle group 36 and is hard to observe visually.

The time T1 as information which indicates a voltage application time in the initial operation may be previously stored in the memory such as ROM (not shown in the drawing) in the control section 18. When processing is executed, the information which indicates the specified time may be read.

Next, a voltage with polarities opposite to the voltage applied between the substrates is applied between the surface electrode 40 and the back electrode 46 so that the surface electrode 40 serves as a positive electrode and the back electrode 46 serves as a negative electrode. As a result, the migrating particle group 34A charged to negative polarity move to the display substrate 20 side and reach the display substrate 20 (refer to FIG. 28). On the other hand, the migrating particles constituting the migrating particle group 34B charged to positive polarity move to the back substrate 22 side and reach the back substrate 22 (refer to FIG. 28).

In this case, on a while background of the color of the reflecting particle group 36, a color exhibited by the migrating particle group 34A is visually observed as the color of the display medium 12 observed from the display substrate 20 side. The migrating particle group 348 is shielded by the reflecting particle group 36 and is hard to observe visually.

Therefore, in the display device 10 (display medium 12) according to the exemplary embodiment, the migrating particle group 34 (the migrating particle group 34A, and the migrating particle group 34B) reaches and adheres to the display substrate 20 or the back substrate 22, thereby performing display.

In the display device 10 (display medium 12) according to the above-described exemplary embodiment, the facing surfaces of the display substrate 20 and the back substrate 22 have the surface layer 42 and the surface layer 48, respectively, each of which includes the specified polymer compound having a silicone chain (polymer compound composed of a copolymer containing the constitutional unit (A) and the constitutional unit (B)). Therefore, even when the migrating particle group 34 moves and adheres to the facing surfaces during repeated display, adhesion of the migrating particles of the migrating particle group 34 is suppressed by the silicone chain and a fluorine atom-containing organic group possessed by the specified polymer compound having a silicon chain. As a result, even in repeated display, color reproducibility and high contrast are realized.

Although the reason for this is not known, it is considered that the silicone chain possessed by the specified polymer compound having a silicon chain contributes to the suppression of adhesion of the migrating particles of the migrating particle group 34 in an early stage, and the fluorine atom-containing organic group possessed by the specified polymer compound having a silicon chain contributes to the suppression of adhesion of the migrating particles of the migrating particle group 34 over time (after repeated display).

In the display medium 12 and the display device 10 according to the above-described exemplary embodiment, the surface electrode 40 and the back electrode 46 are provided on the display substrate 20 and the back substrate 22, respectively, so that the particle group 34 is moved between the substrates by applying a voltage between the electrodes (i.e., between the substrates) to perform display. However, a display mode is not limited to this, and, for example, the surface electrode 40 may be provided on the display substrate 20, while an electrode may be provided on the space member so that the particle group 34 is moved between the display substrate 20 and the space member by applying a voltage between the electrodes to perform display.

In addition, in the display medium 12 and the display device 10 according to the above-described exemplary embodiment, the two types (two colors) of particle groups (34A and 34B) are used as the particle group 34. However, one type (one color) of particle group may be used or three types (three colors) of particle groups may be used.

EXAMPLES

Although the present invention is described in further detail below with reference to examples, the present invention is not limited to these examples.

[Synthesis of Polymer Compound]
-Polymer Compound A-

First, 10 parts by mass of Silaplane FM-0721 (manufactured by Chisso Corporation, weight-average molecular weight Mw=5,000), 5 parts by mass of 1H,1H,5H-octafluoropentyl methacrylate (OFPMA: manufactured by Wako Pure Chemical Industries, Ltd.), and 85 parts by mass of 2-hydroxyethyl methacrylate (HEMA: monomer constituting the other constitutional unit (C)) are dissolved in 100 parts by mass of isopropyl alcohol, and 0.5 part by mass of 2,2'-bisazo(2,4-dimethylvaleronitrile) (V-65 manufactured by Wako Pure Chemical Industries, Ltd.) is added to the resultant solution, followed by stirring and reaction at 55° C. for 18 hours.

Then, isopropyl alcohol is removed, and the residue is dried under reduced pressure to produce polymer compound A (Exemplified Compound 1-3). The weight-average molecular weight is 250,000.

Then, the polymer compound A is diluted with isopropyl alcohol to prepare a 4% by mass isopropyl alcohol solution of the polymer compound A.

-Polymer Compound B-

First, 10 parts by mass of Silaplane FM-0721 (manufactured by Chisso Corporation, weight-average molecular weight Mw=5,000), 5 parts by mass of 3,3,4,4,5,5,6,6,7,7,8,8,9,9,10,10,10-heptadecafluorodecyl methacrylate (HD-FDMA: manufactured by Wako Pure Chemical Industries, Ltd.), and 85 parts by mass of 2-hydroxyethyl methacrylate are dissolved in 100 parts by mass of isopropyl alcohol, and 0.5 part by mass of 2,2'-bisazo(2,4-dimethylvaleronitrile) (V-65 manufactured by Wako Pure Chemical Industries, Ltd.) is added to the resultant solution, followed by stirring and reaction at 55° C. for 18 hours.

Then, isopropyl alcohol is removed, and the residue is dried under reduced pressure to produce polymer compound B (Exemplified Compound 1-2). The weight-average molecular weight is 250,000.

Then, the polymer compound B is diluted with isopropyl alcohol to prepare a 4% by mass isopropyl alcohol solution of the polymer compound B.

-Polymer Compound C-

First, 10 parts by mass of Silaplane FM-0721 (manufactured by Chisso Corporation, weight-average molecular weight Mw=5,000), 5 parts by mass of 1H,1H,5H-octafluoropentyl methacrylate (OFPMA: manufactured by Wako Pure Chemical Industries, Ltd.), and 85 parts by mass of methyl methacrylate (MMA: monomer constituting the other constitutional unit (C)) are dissolved in 100 parts by mass of isopropyl alcohol, and 0.5 part by mass of 2,2'-bisazo(2,4-dimethylvaleronitrile) (V-65 manufactured by Wako Pure Chemical Industries, Ltd.) is added to the resultant solution, followed by stirring and reaction at 55° C. for 18 hours.

Then, isopropyl alcohol is removed, and the residue is dried under reduced pressure to produce polymer compound C. The weight-average molecular weight is 250,000.

Then, the polymer compound C is diluted with isopropyl alcohol to prepare a 4% by mass isopropyl alcohol solution of the polymer compound C.

-Polymer Compound D-

First, 10 parts by mass of Silaplane FM-0721 (manufactured by Chisso Corporation, weight-average molecular weight Mw=5,000), 5 parts by mass of 1H,1H,5H-octafluoropentyl methacrylate (OFPMA: manufactured by Wako Pure Chemical Industries, Ltd.), and 85 parts by mass of 1-vinyl-2-pyrrolidone (VP: monomer constituting the other constitutional unit (C)) are dissolved in 100 parts by mass of isopropyl alcohol, and 0.5 part by mass of 2,2'-bisazo(2,4-dimethylvaleronitrile) (V-65 manufactured by Wako Pure Chemical Industries, Ltd.) is added to the resultant solution, followed by stirring and reaction at 55° C. for 18 hours.

Then, isopropyl alcohol is removed, and the residue is dried under reduced pressure to produce polymer compound D. The weight-average molecular weight is 250,000.

Then, the polymer compound D is diluted with isopropyl alcohol to prepare a 4% by mass isopropyl alcohol solution of the polymer compound D.

-Polymer Compound E-

First, 10 parts by mass of Silaplane FM-0721 (manufactured by Chisso Corporation, weight-average molecular weight Mw=5,000), 1 part by mass of 1H,1H,5H-octafluoropentyl methacrylate (OFPMA: manufactured by Wako Pure Chemical Industries, Ltd.), and 89 parts by mass of 2-hydroxyethyl methacrylate (HEMA: monomer constituting the other constitutional unit (C)) are dissolved in 100 parts by mass of isopropyl alcohol, and 0.5 part by mass of 2,2'-bisazo (2,4-dimethylvaleronitrile) (V-65 manufactured by Wako Pure Chemical Industries, Ltd.) is added to the resultant solution, followed by stirring and reaction at 55° C. for 18 hours.

Then, isopropyl alcohol is removed, and the residue is dried under reduced pressure to produce polymer compound E. The weight-average molecular weight is 250,000.

Then, the polymer compound E is diluted with isopropyl alcohol to prepare a 4% by mass isopropyl alcohol solution of the polymer compound E.

-Polymer Compound F-

First, 5 parts by mass of Silaplane FM-0721 (manufactured by Chisso Corporation, weight-average molecular weight Mw=5,000), 5 parts by mass of 1H,1H,5H-octafluoropentyl methacrylate (OFPMA: manufactured by Wako Pure Chemical Industries, Ltd.), and 90 parts by mass of 2-hydroxyethyl methacrylate (HEMA: monomer constituting the other constitutional unit (C)) are dissolved in 100 parts by mass of isopropyl alcohol, and 0.5 part by mass of 2,2'-bisazo(2,4-dimethylvaleronitrile) (V-65 manufactured by Wako Pure Chemical Industries, Ltd.) is added to the resultant solution, followed by stirring and reaction at 55° C. for 18 hours.

Then, isopropyl alcohol is removed, and the residue is dried under reduced pressure to produce polymer compound F. The weight-average molecular weight is 250,000.

Then, the polymer compound F is diluted with isopropyl alcohol to prepare a 4% by mass isopropyl alcohol solution of the polymer compound F.

-Polymer Compound G-

First, 20 parts by mass of Silaplane FM-0721 (manufactured by Chisso Corporation, weight-average molecular weight Mw=5,000), 20 parts by mass of 1H,1H,5H-octafluoropentyl methacrylate (OFPMA: manufactured by Wako Pure Chemical Industries, Ltd.), and 60 parts by mass of 2-hydroxyethyl methacrylate (HEMA: monomer constituting the other constitutional unit (C)) are dissolved in 100 parts by mass of isopropyl alcohol, and 0.5 part by mass of 2,2'-bisazo(2,4-dimethylvaleronitrile) (V-65 manufactured by Wako Pure Chemical Industries, Ltd.) is added to the resultant solution, followed by stirring and reaction at 55° C. for 18 hours.

Then, isopropyl alcohol is removed, and the residue is dried under reduced pressure to produce polymer compound G. The weight-average molecular weight is 250,000.

Then, the polymer compound G is diluted with isopropyl alcohol to prepare a 4% by mass isopropyl alcohol solution of the polymer compound G.

-Polymer Compound H-

First, 10 parts by mass of Silaplane FM-0721 (manufactured by Chisso Corporation, weight-average molecular weight Mw=5,000), 5 parts by mass of 2,2,2-trifluoroethyl methacrylate (TFEMA: manufactured by Wako Pure Chemical Industries, Ltd.), and 85 parts by mass of 2-hydroxyethyl methacrylate (HEMA: monomer constituting the other constitutional unit (C)) are dissolved in 100 parts by mass of isopropyl alcohol, and 0.5 part by mass of 2,2'-bisazo(2,4-dimethylvaleronitrile) (V-65 manufactured by Wako Pure Chemical Industries, Ltd.) is added to the resultant solution, followed by stirring and reaction at 55° C. for 18 hours.

Then, isopropyl alcohol is removed, and the residue is dried under reduced pressure to produce polymer compound H. The weight-average molecular weight is 250,000.

Then, the polymer compound H is diluted with isopropyl alcohol to prepare a 4% by mass isopropyl alcohol solution of the polymer compound H.

-Polymer Compound I (Polymer Compound of Comparative Example)-

First, 10 parts by mass of Silaplane FM-0721 (manufactured by Chisso Corporation, weight-average molecular weight Mw=5,000) and 90 parts by mass of hydroxyethyl methacrylate (manufactured by Wako Pure Chemical Industries, Ltd.) are mixed with 300 parts by mass of isopropyl alcohol (IPA), and 1 part by mass of AIBN (2,2-azobis-isobutyronitrile) serving as a polymerization initiator is dissolved in the resultant mixture, followed by polymerization under nitrogen at 70° C. for 6 hours. The product is purified by reprecipitation with hexane used as a solvent and then dried to produce polymer compound I.

-Polymer Compound J (Polymer Compound of Comparative Example)-

First, 5 parts by mass of 1H,1H,5H-octafluoropentyl methacrylate (manufactured by Wako Pure Chemical Industries, Ltd.) and 95 parts by mass of hydroxyethyl methacrylate (manufactured by Wako Pure Chemical Industries, Ltd.) are mixed with 300 parts by mass of isopropyl alcohol (IPA), and 1 part by mass of AIBN (2,2-azobis-isobutyronitrile) serving as a polymerization initiator is dissolved in the resultant mixture, followed by polymerization under nitrogen at 70° C. for 6 hours. The product is purified by reprecipitation with hexane used as a solvent and then dried to produce polymer compound J.

[Preparation of Migrating Particle Dispersion Solution]

-Magenta Particle (Negatively Charged Particle) Dispersion Solution-

First, 4 parts by mass of silicone-modified polymer KP-545 (manufactured by Shin-Etsu Chemical Co.) is dissolved in 96 parts by mass of dimethyl silicone oil (KF-96-2CS, manufactured by Shin-Etsu Chemical Co.) to prepare solution X. Next, 10 parts by mass of styrene acryl polymer (neutralized with dimethylethanolamine), 5 parts by mass of an aqueous pigment dispersion solution (Unisuper magenta color, manufactured by Ciba Co., pigment content 20% by weight), and 85 parts by mass of pure water are mixed to prepare solution Y. The resultant solutions X and Y are mixed and dispersed/emulsified with an ultrasonic disintegrator (UH-600S manufactured by SMT Co., Ltd.).

Next, the resultant suspension is heated (70° C.) under reduced pressure (2 KPa) to remove moisture and adjust the concentration, thereby preparing a silicone oil dispersion solution (particle solid content 5% by weight) in which migrating particles containing a magenta pigment are dispersed in silicone oil.

As a result of measurement of the volume-average particle diameter (Horiba LA-300: laser light scattering-diffraction particle size analyzer) of the magenta particles (migrating particles) in the prepared magenta particle dispersion solution, the volume-average particle diameter is 280 nm.

The charge polarity of the magenta particles in the prepared magenta particle dispersion solution is measured by sealing the dispersion solution between two electrode substrates and applying a DC current to evaluate the migration direction. As a result, the magenta particles are negatively charged.

[Preparation of Reflecting Particle Dispersion Solution]

-White Particle Dispersion Solution-

In a 100-ml three-neck flask provided with a reflux condenser, 5 parts by weight of 2-vinylnaphthalene (manufactured by Nippon Steel Chemical Co., Ltd.), 5 parts by weight of silicone macromer FM-0721 (manufactured by Chisso Corporation), 0.3 part by weight of lauroyl peroxide (manufactured by Wako Pure Chemical Industries, Ltd.) serving as an initiator, and 20 parts by weight of silicone oil KF-96L-1CS (manufactured by Shin-Etsu Chemical Co.) are added, and the resultant mixture is bubbled with nitrogen gas for 15 minutes, followed by polymerization at 65° C. for 24 hours in a nitrogen atmosphere.

The resultant white particles are adjusted to a solid content of 40 wt % with silicon oil, preparing a white particle dispersion solution. The particle diameter of the white particles is 450 nm.

Examples 1 to 8, Comparative Example 1

-Formation of Display Medium Cell for Evaluation-

ITO (indium tin oxide) is deposited to a thickness of 50 nm by sputtering to form an electrode on a glass substrate having a thickness of 0.7 mm, preparing an ITO substrate. Then, a layer of each of the polymer compounds shown in Table 1 is formed as a surface layer on the ITO substrate.

A layer of each of the polymer compounds is formed as follows: First, the polymer compound is dissolved in IPA (isopropyl alcohol) so that a solid content is 4 wt %, and the resultant solution is applied on the ITO substrate by a spin coating method and then dried at 130° C. for 1 hour to form a polymer compound layer having a thickness of 100 nm.

Two ITO substrates with the surface layers formed as described above are prepared as a display substrate and a back substrate. The display substrate is superposed on the back substrate using a 50 μm Teflon (trade name) sheet as a spacer so that the surface layers face each other, and the substrates are fixed with a clip.

Then, a mixture of 40 parts by mass of the white particle dispersion solution and 10 parts by mass of the magenta particle dispersion solution is injected into a space between the two ITO substrates with the surface layers, thereby preparing a display medium cell for evaluation.

-Evaluation-

The prepared display medium cell for evaluation is used, and a voltage of 20 V is applied between the substrates (between the ITO electrodes) so that the display substrate (the ITO electrode thereof) is positive, and the back substrate (the ITO electrode thereof) is negative. As a result, the negatively charged magenta particles migrate to the display substrate side, and the color (magenta color) of the magenta particles is observed from the display substrate side.

Next, a voltage of 20 V is applied between the substrates (between the ITO electrodes) so that the display substrate (the ITO electrode thereof) is negative, and the back substrate (the ITO electrode thereof) is positive. As a result, the negatively charged magenta particles migrate to the back substrate side, and the color (white color) of the white particles is observed from the display substrate side.

Then, under this condition, the pair of substrates are separated from each other, and the substrate surface (the surface of the display substrate) is observed with an optical microscope to examine the adhesion state of the particles.

In addition, the operation of displaying the magenta color and white color is repeated 500 times, 1000 times, and 5000 times. Then, the substrate surface is observed with an optical microscope to examine the adhesion state of the particles by the same method as the above. The results are shown in Table 1.

The evaluation criteria are as follows:

Level 1: No adhesion of particles

Level 2: Slight adhesion of particles is observed at a level of no practical problem.

Level 3: Much adhesion of particles is observed at a visible level.

TABLE 1

| | | Polymer compound | | | | | | Adhesion of particles to surface of substrate | | | |
|---|---|---|---|---|---|---|---|---|---|---|---|
| | | Raw material | | | | | | | | | |
| | | Monomer of constitutional unit (A) | | Monomer of constitutional unit (B) | | Monomer of other constitutional unit (C) | | | | | |
| | Type | Type | Parts by mass (mol %) | Type | Parts by mass (mol %) | Type | Parts by mass (mol %) | 1 time | 500 times | 1000 times | 5000 times |
| Example 1 | A | FM0721 | 10 (0.3 mol %) | OFPMA | 5 (2.5 mol %) | HEMA | 85 (97.2 mol %) | Level 1 | Level 1 | Level 1 | Level 1 |
| Example 2 | B | FM0721 | 10 (0.3 mol %) | HDFDMA | 5 (1.4 mol %) | HEMA | 85 (98.3 mol %) | Level 1 | Level 1 | Level 1 | Level 1 |
| Example 3 | C | FM0721 | 10 (0.2 mol %) | OFPMA | 5 (1.9 mol %) | MMA | 85 (97.9 mol %) | Level 1 | Level 1 | Level 1 | Level 1 |
| Example 4 | D | FM0721 | 10 (0.3 mol %) | OFPMA | 5 (2.1 mol %) | VP | 85 (97.6 mol %) | Level 1 | Level 1 | Level 1 | Level 1 |
| Example 5 | E | FM0721 | 10 (0.3 mol %) | OFPMA | 1 (0.5 mol %) | HEMA | 89 (99.2 mol %) | Level 1 | Level 1 | Level 1 | Level 2 |
| Example 6 | F | FM0721 | 5 (0.2 mol %) | OFPMA | 5 (2.3 mol %) | HEMA | 90 (97.5 mol %) | Level 1 | Level 1 | Level 1 | Level 1 |
| Example 7 | G | FM0721 | 20 (0.8 mol %) | OFPMA | 20 (13 mol %) | HEMA | 60 (86.2 mol %) | Level 1 | Level 1 | Level 1 | Level 1 |
| Example 8 | H | FM0721 | 10 (0.3 mol %) | TFEMA | 5 (4.3 mol %) | HEMA | 85 (95.4 mol %) | Level 1 | Level 1 | Level 1 | Level 1 |
| Comparative Example 1 | I | FM0721 | 10 (0.3 mol %) | No | — | HEMA | 90 (99.7 mol %) | Level 1 | Level 1 | Level 1 | Level 3 |

TABLE 1-continued

| | | Polymer compound | | | | | | | | | |
| | | Raw material | | | | | | | | | |
| | | Monomer of constitutional unit (A) | | Monomer of constitutional unit (B) | | Monomer of other constitutional unit (C) | | Adhesion of particles to surface of substrate | | | |
| | Type | Type | Parts by mass (mol %) | Type | Parts by mass (mol %) | Type | Parts by mass (mol %) | 1 time | 500 times | 1000 times | 5000 times |
| --- | --- | --- | --- | --- | --- | --- | --- | --- | --- | --- | --- |
| Comparative Example 2 | J | No | — | OFPMA | 5 (2.2 mol %) | HEMA | 95 (97.8 mol %) | Level 2 | Level 3 | Level 3 | Level 3 |

Details in Table 1 are as follows:

FM0721: Silaplane FM-0721 (manufactured by Chisso Corporation, weight-average molecular weight Mw=5,000; structural formula (X1) [n=68, $R_1$=butyl group], monomer constituting the constitutional unit (A) in which $Ra_1$=methyl group, and n=3)

OFPMA: 1H,1H,5H-octafluoropentyl methacrylate (manufactured by Wako Pure Chemical Industries, Ltd.)

HDFDMA: 3,3,4,4,5,5,6,6,7,7,8,8,9,9,10,10,10-heptadecafluorodecyl methacrylate (manufactured by Wako Pure Chemical Industries, Ltd.)

TFEMA: 2,2,2-trifluoroethyl methacrylate (manufactured by Wako Pure Chemical Industries, Ltd.)

HEMA: 2-hydroxyethyl methacrylate

MMA: methyl methacrylate

VP: 1-vinyl-2-pyrrolidone

The above results indicate that in the examples, adhesion of the migrating particles to the substrate surface is suppressed even by repeating display as compared with the comparative examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display medium comprising:
a pair of substrates at least one of which has transparency and one of each surfaces of which are facing and disposed with a space therebetween;
a dispersion medium sealed between the pair of substrates;
a group of migrating particles dispersed in the dispersion medium so as to migrate in the dispersion medium according to an electric field formed between the pair of substrates; and
a surface layer provided on at least one of the facing surfaces of the pair of substrates and including a polymer compound that is a copolymer containing the following constitutional unit (A) and constitutional unit (B):

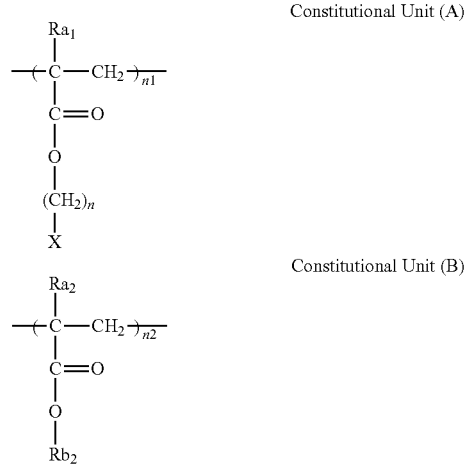

wherein in the constitutional units (A) and (B), X represents a group containing a silicone chain, $Ra_1$ and $Ra_2$ each independently represent a hydrogen atom or a methyl group, $Rb_2$ represents an organic group containing a fluorine atom, n1 and n2 each represent mol % of the constitutional unit relative to the whole copolymer and satisfy 0<n1<50 and 0<n2<50, respectively, and n represents a natural number of 1 or more and 3 or less.

2. The display medium according to claim 1, wherein in the constitutional units (A) and (B), $Rb_2$ represents —$(CH_2)_{m1}$—$(CF_2)_{m2}$—$Rb_{21}$
wherein m1 represents a natural number of 0 to 4,
m2 represents a natural number of 0 to 20, and
$Rb_{21}$ represents a —$CH_2F$ group, a —$CHF_2$ group, or a —$CF_3$ group.

3. The display medium according to claim 1, wherein the dispersion medium includes an insulating liquid.

4. The display medium according to claim 3, wherein the dispersion medium includes a polymer resin.

5. The display medium according to claim 3, wherein the dispersion medium includes a coloring agent.

6. The display medium according to claim 1, wherein a volume resistivity of the dispersion medium is $10^{11}$ Ωcm or more.

7. The display medium according to claim 1, wherein the dispersion medium includes a silicone oil.

8. The display medium according to claim 1, wherein the dispersion medium includes a pure water a volume resistivity of which is $10^3$ Ωcm or more.

9. The display medium according to claim 1, wherein the migrating particles include one or more of a glass bead, a insulating metal oxide particle, a thermoplastic resin particle, a thermosetting resin particle, a resin particle containing a coloring agent fixed to a surface thereof, a particle of thermoplastic resin containing a coloring agent, a particle of thermosetting resin containing a coloring agent, and a metal colloid particle having a plasmon coloring function.

10. The display medium according to claim 1, further comprising:
   a group of reflecting particles which have different optical reflection characteristic from the migrating particles and have a property so that the migration particles migrate through the reflecting particles between the facing surfaces of the pair of substrates when an electric field is applied between the pair of substrates.

11. A display device comprising:
   the display medium according to claim 1; and
   a voltage applying section that applies a voltage between the pair of substrates.

* * * * *